United States Patent [19]

Hwang et al.

[11] Patent Number: 5,098,449
[45] Date of Patent: Mar. 24, 1992

[54] SELF-REINFORCED SILICON NITRIDE CERAMIC WITH CRYSTALLINE GRAIN BOUNDARY PHASE, AND A METHOD OF PREPARING THE SAME

[75] Inventors: Chinmau J. Hwang; Aleksander J. Pyzik, both of Midland, Mich.

[73] Assignee: The Dow Chemical Company, Midland, Mich.

[21] Appl. No.: 657,716

[22] Filed: Feb. 19, 1991

Related U.S. Application Data

[63] Continuation-in-part of Ser. No. 5,721,823, Aug. 24, 1990, which is a continuation-in-part of Ser. No. 398,801, Aug. 25, 1989, Pat. No. 5,021,372, which is a continuation-in-part of Ser. No. 297,627, Jan. 3, 1989, abandoned, which is a continuation-in-part of Ser. No. 148,748, Jan. 27, 1988, Pat. No. 4,883,776.

[51] Int. Cl.$^5$ .............................................. C04B 35/58
[52] U.S. Cl. ....................... 51/307; 501/95; 501/97; 501/98; 264/65
[58] Field of Search ............... 501/95, 97, 98; 264/65; 51/307

[56] References Cited

U.S. PATENT DOCUMENTS

| | | | |
|---|---|---|---|
| 3,950,464 | 4/1976 | Masaki | 264/65 |
| 4,004,937 | 1/1977 | Masaki | 106/59 |
| 4,025,351 | 5/1977 | Masaki | 106/59 |
| 4,046,580 | 9/1977 | Ishii et al. | 106/55 |
| 4,097,293 | 6/1978 | Komeya et al. | 106/43 |
| 4,119,689 | 10/1978 | Prochazka et al. | 264/65 |
| 4,179,301 | 12/1979 | Buijan | 106/73.5 |
| 4,218,257 | 9/1980 | Oda et al. | 106/73.5 |
| 4,227,842 | 10/1980 | Samanta et al. | 409/131 |
| 4,279,657 | 7/1981 | Greskovich | 106/73.5 |
| 4,296,065 | 10/1981 | Ishii et al. | 264/325 |
| 4,323,325 | 4/1982 | Samanta et al. | 409/131 |
| 4,406,668 | 9/1983 | Sarin et al. | 51/295 |
| 4,407,970 | 10/1983 | Komatsu et al. | 501/97 |
| 4,511,402 | 4/1985 | Miura et al. | 75/233 |
| 4,511,525 | 4/1985 | Tsuge et al. | 264/65 |
| 4,543,345 | 9/1985 | Wei et al. | 501/95 |
| 4,603,116 | 7/1986 | Smith et al. | 501/97 |
| 4,609,633 | 9/1986 | Fukuhara et al. | 501/97 |
| 4,622,186 | 11/1986 | Mizutani | 264/62 |
| 4,652,276 | 3/1987 | Burden | 51/308 |
| 4,699,890 | 10/1987 | Matsui | 501/98 |
| 4,717,693 | 1/1988 | Wittmer | 501/97 |
| 4,734,234 | 3/1988 | Sterzel | 264/66 |
| 4,753,764 | 6/1988 | Kamijo | 264/63 |
| 4,830,991 | 5/1989 | Matsui | 501/97 |
| 4,870,036 | 9/1989 | Yeh | 501/97 |
| 4,891,342 | 1/1990 | Yokoyama | 501/97 |
| 4,920,085 | 4/1990 | Yoshida et al. | 501/97 |
| 4,923,829 | 5/1990 | Yasutomi et al. | 501/95 |
| 5,002,907 | 3/1991 | Hayakawa et al. | 501/97 |
| 5,015,608 | 5/1991 | Matsuhisa et al. | 501/97 |
| 5,017,531 | 5/1991 | Ukai et al. | 501/98 |

FOREIGN PATENT DOCUMENTS

| | | |
|---|---|---|
| 0079678 | 5/1983 | European Pat. Off. |
| 0100380 | 2/1984 | European Pat. Off. |
| 0228022 | 7/1987 | European Pat. Off. |
| 8908625 | 9/1989 | European Pat. Off. |
| 58-64274 | 4/1983 | Japan |
| 59-21413 | 2/1984 | Japan |
| 61-78657 | 4/1986 | Japan |
| 61-97167 | 5/1986 | Japan |
| 0106430 | 5/1986 | Japan |

OTHER PUBLICATIONS

Chemical Abstract 97:132331w (1982).
Derwent 86:165122/26.
Derwent 87:098199/14.
Crystallization of Y-Al-Garnet in Pressureless Sintered β-Sialon Materials, Greil et al.
Akihiko Tsuge et al., Journal of the Amertical Ceramics Society, 58, 323-326 (1975).
Osami Abe, Ceramics International, 53-60, (1989).

*Primary Examiner*—Karl Group

[57] ABSTRACT

A fully densified, self-reinforced silicon nitride ceramic body of high fracture toughness and high fracture strength is disclosed comprising (a) β-silicon nitride in the form of whiskers having an average aspect ratio of at least about 2.5, and (b) a crystalline grain boundary phase having an oxynitride apatite structure, as determined by X-ray crystallography.

A process for preparing the above identified silicon nitride body comprising hot-pressing a powder mixture containing silicon nitride; silica; a densification aid including strontium oxide; a conversion aid, such as, yttrium oxide; and a compound, such as, calcium oxide which enhances growth of β-silicon nitride whiskers, under conditions such that densification and the in situ formation of β-silicon nitride whiskers having a high aspect ratio occur, and thereafter annealing the densified composition for a time sufficient to produce a crystalline grain boundary phase having an oxynitride apatite structure.

30 Claims, No Drawings

SELF-REINFORCED SILICON NITRIDE CERAMIC WITH CRYSTALLINE GRAIN BOUNDARY PHASE, AND A METHOD OF PREPARING THE SAME

CROSS-REFERENCE TO RELATED APPLICATION

This application is a continuation-in-part of co-pending application Ser. No. 07/572,823, filed Aug. 24, 1990, pending which is a continuation-in-part of copending application Ser. No. 07/398,801, filed Aug. 25, 1989, now U.S. Pat. No. 5,021,372, which is a continuation-in-part of application Ser. No 07/297,627, filed Jan. 13, 1989, now abandoned, which is a continuation-in-part of application Ser. No. 07/148,748, filed Jan. 27, 1988, now U.S. Pat. No. 4,883,776.

BACKGROUND OF THE INVENTION

This invention pertains to a silicon nitride ($Si_3N_4$) ceramic body and a process for preparing the ceramic body.

Silicon nitride ceramics are recognized for their excellent mechanical and physical properties, including good wear resistance, low coefficient of thermal expansion, good thermal shock resistance, high creep resistance and high electrical resistivity. In addition, silicon nitride ceramics are resistant to chemical attack, particularly to oxidation. Because of these attributes, silicon nitride is useful in a variety of wear and high temperature applications, such as cutting tools and parts in pumps and engines.

Failure of silicon nitride ceramics is generally associated with brittleness and flaws. The object therefore is to prepare a silicon nitride ceramic with high fracture toughness ($K_{IC}$) and strength. Fracture strength is directly proportional to the fracture toughness and inversely proportional to the square root of the flaw size. High fracture toughness combined with small flaw size is therefore highly desirable, Mono-lithic silicon nitride, however, has a relatively low fracture toughness of about 5 MPa $(m)^{\frac{1}{2}}$.

In order to obtain a fully densified silicon nitride ceramic, a densification aid, such as magnesia, is almost always necessary. On sintering the densification aid typically forms a glassy grain boundary phase, which acts as a matrix into which the grains of crystalline silicon nitride are embedded. Disadvantageously, the glassy phase is responsible for a loss of strength and a low creep resistance in the ceramic at high temperatures. It is believed that this lowering results from a softening of the glass and a concomitant enhancement in subcritical crack growth and grain boundary sliding. In addition, the glassy phase is responsible for a lowering of oxidation resistance at high temperatures.

It is reported that the high temperature material properties of silicon nitride ceramics can be improved if the grain boundary phase is crystalline rather than glassy. For example, A. Tsuge, K. Nishida and M. Komatsu disclose in the Journal of the American Ceramic Society, 58, (1975) 323-326, a hot-pressed silicon nitride ceramic containing a crystalline grain boundary phase identified as $Si_3N_4 \cdot Y_2O_3$ prepared by pre-sintering and then hot-pressing a powder predominantly of silicon nitride and yttria. The ceramic is disclosed to have improved high temperature strength when compared to a silicon nitride ceramic having a glassy grain boundary phase of yttria. Disadvantageously, the pre-sintered and hot-pressed ceramic does not have sufficient strength and toughness to meet current commercial standards.

U.S. Pat. No. 4,920,085 discloses a silicon nitride sintered body comprising $\beta$-$Si_3N_4$ and further comprising a crystalline grain boundary phase in an amount less than 90 weight percent of the total grain boundary phases, the balance being a glassy composition. The crystalline phase contains one or more of the stoichiometric compositions $M_4Si_2O_7N_2$, $M_{10}Si_2O_{23}N_4$ or $MSiO_2N$, wherein M is selected from the group consisting of scandium, terbium, erbium, holmium, and dysprosium. Disadvantageously, this sintered body possesses a considerable amount of glassy grain boundary phase which lowers strength and creep resistance.

It would be very desirable to have a silicon nitride ceramic of high fracture toughness, high fracture strength, and high oxidation resistance at high temperatures. Moreover, it would be highly desirable to have a process which would be reproducible, inexpensive, and amenable to industrial scale-up for preparing such a tough and strong silicon nitride ceramic.

SUMMARY OF THE INVENTION

In a first aspect this invention is a process for preparing a self-reinforced silicon nitride ceramic body containing a phase of predominately $\beta$-silicon nitride whiskers having a high average aspect ratio, and further containing a crystalline grain boundary phase having an oxynitride apatite structure. For the purposes of the present invention a "high" average aspect ratio means an average aspect ratio of at least about 2.5. The process comprises subjecting a powder mixture comprising:

(a) silicon nitride in an amount sufficient to provide a ceramic body;

(b) a densification aid, said densification aid being a source of strontium, optionally, in combination with a source of an element selected from the group consisting of barium, calcium, lithium, and sodium, said source(s) being present in an amount sufficient to promote densification of the powder;

(c) a conversion aid, said conversion aid being a source of an element selected from the group consisting of yttrium, lanthanum, cerium, neodymium, samarium, europium, gadolinium, terbium, dysprosium, holmium, erbium, ytterbium, and thorium, said source being present in an amount sufficient to promote the conversion of the starting silicon nitride to predominantly $\beta$-silicon nitride, (d) at least one whisker growth enhancing compound in an amount sufficient to promote the formation of $\beta$-silicon nitride whiskers, said compound being an oxide or non-oxide derivative of calcium, lithium, sodium, scandium, titanium and aluminum; and (e) silica in an amount sufficient to provide an oxynitride apatite crystalline grain boundary phase;

to conditions of temperature and pressure sufficient to provide for densification and in situ formation of $\beta$-silicon nitride whiskers having a high average aspect ratio, and thereafter subjecting the densified composition to annealing for a time sufficient to provide formation of a crystalline grain boundary phase having an oxynitride apatite structure, as determined by X-ray crystallography. In this manner a self-reinforced silicon nitride ceramic body having a toughness greater than about 37 kg/mm, as measured by the Palmqvist technique described hereinafter, is formed. Any means may be used to apply pressure and temperature so long as sufficient densification and in situ whisker formation occur. Likewise, any means of annealing may be employed so long as a crystalline grain boundary phase is formed.

In a related aspect, the powder mixture further comprises a Palmqvist toughness enhancing amount of at least one preformed reinforcing material. The material is selected from the group consisting of silicon carbide, titanium carbide, boron carbide, titanium diboride, and zirconium oxide. The materials are in forms selected from the group consisting of whiskers, fibers, particles and platelets.

In a second aspect, this invention is a silicon nitride ceramic body having a toughness greater than about 37 kg/mm, as measured by the Palmqvist technique described hereinafter, comprising:

(a) a crystalline phase of $\beta$-silicon nitride of which at least about 20 volume percent, as measured by viewing one plane of the silicon nitride ceramic body by scanning electron microscopy, is in the form of whiskers having an average aspect ratio of at least about 2.5; and (b) a crystalline grain boundary phase of an oxynitride apatite structure, as determined by X-ray crystallography, in an amount not greater than about 35 weight percent of the total weight, represented by the general formula $A_xB_{10-x}[Si(O,N)_4]_6(O,N)_y$ wherein A is strontium, optionally, in combination with calcium, barium, lithium, sodium, scandium, titanium, aluminum, or mixture thereof; B is yttrium, lanthanum, cerium, neodymium, samarium, europium, gadolinium, terbium, dysprosium, holmium, erbium, ytterbium, or thorium, or mixture thereof; x is a positive number greater than 0 and less than or equal to about 4; and y is a positive number ranging from 0 to about 2.

In a related aspect, the silicon nitride ceramic body further comprises a Palmqvist toughness enhancing amount of at least one preformed reinforcing material. The material is selected from the group consisting of $\beta$-silicon nitride fibers or whiskers or silicon carbide, titanium carbide, boron carbide, titanium diboride, or zirconium oxide in at least one form selected from the group consisting of whiskers, fibers, particles and platelets.

In a third aspect, this invention is a cutting tool comprising the above-identified silicon nitride ceramic body.

The silicon nitride ceramic body of this invention exhibits a significantly higher fracture toughness than the monolithic or whisker-reinforced silicon nitride ceramics of the prior art. Moreover, if the fracture toughness of the silicon nitride ceramic of this invention is normalized with respect to density, the normalized fracture toughness and fracture strength are among the highest known for any ceramic material. Advantageously, the silicon nitride ceramic of this invention is self-reinforced. More advantageously, the process for preparing the novel, self-reinforced silicon nitride ceramic body of this invention is reproducible, amenable to industrial scale-up, and less expensive than processes using silicon carbide whisker reinforcement. Most advantageously, the room temperature fracture strength of the ceramic body of this invention is maintained at high temperatures, for example about 1200° C. or greater, therefore the ceramic is suitable for high temperature applications.

DETAILED DESCRIPTION OF THE INVENTION

The silicon nitride starting material used in preparing the ceramic body of this invention can be any silicon nitride powder, including the crystalline forms of $\alpha$-silicon nitride and $\beta$-silicon nitride, or noncrystalline amorphous silicon nitride, or mixtures thereof. Preferably, the silicon nitride powder is predominately in the alpha crystalline form or the amorphous form, or mixtures thereof. More preferably, the starting silicon nitride is predominately in the alpha crystalline form. It is also advantageous if the preferred starting powder possesses a high $\alpha/\beta$ weight ratio. Preferably, the starting powder contains no greater than about 20 weight percent $\beta$-silicon nitride; more preferably, no greater than about 10 weight percent $\beta$-silicon nitride; most preferably, no greater than about 6 weight percent $\beta$-silicon nitride.

Generally, the higher the purity of the starting silicon nitride powder, the better will be the properties of the finished ceramic body. Depending on the source, however, the silicon nitride powder may contain nonmetallic impurities. Some impurities may be tolerated in the powder, although it is preferred to minimize these as much as possible. Carbon, for example, which is likely to form silicon carbide during hot-pressing or sintering, is tolerable in small amounts. Elemental silicon is usually present in amounts ranging up to about 0.5 weight percent. These amounts of elemental silicon are not deleterious and can be tolerated. Oxygen is present to some extent in the form of silica, $SiO_2$, which usually is found as a coating on the surface of the silicon nitride particles. The amount of silica varies according to the purity of the starting silicon nitride powder and its method of manufacture. The silica content may be reduced by leaching or increased by adding free silica in order to attain a desired total silica content, as described in further detail hereinafter.

The silicon nitride starting powder can be of any size or surface area provided that the ceramic body of this invention is obtained by hot-pressing. Large particles having an average diameter in the range from about 15 $\mu$m to about 50 $\mu$m, for example, may be in the form of hard agglomerates which cannot be easily broken. Powders containing such agglomerates make poor ceramics. On the other hand, very fine powders having an average diameter less than about 0.2 $\mu$m are difficult to obtain uniformly and to process. Preferably, the particles have an average diameter in the range from about 0.2 $\mu$m to about 10.0 $\mu$m; more preferably, from about 0.5 $\mu$m to about 3.0 $\mu$m. Preferably, the surface area of the silicon nitride particles is in the range from about 5 $m^2/g$ to about 15 $m^2/g$, as determined by the Brunauer-Emmett-Teller (BET) method of measuring surface area, which is described by C. N. Satterfield in *Heterogeneous Catalysis in Practice,* McGraw-Hill Book Company, 1980, pp. 102-105. More preferably, the surface area is in the range from about 8 $m^2/g$ to about 15 $m^2/g$.

The silicon nitride is present in an amount which is suitably in a range of from about 65 to about 99.75 weight percent based on total powder mixture weight. The range is desirably from about 80 to about 97 weight percent based upon total powder mixture weight. When a reinforcing material is present, the amount of silicon nitride is reduced so that a total of silicon nitride plus reinforcing material falls within these ranges.

In the process of this invention, the silicon nitride powder is mixed with other metallic oxide or non-oxide components, and the powder mixture is heated under pressure to obtain a densified ceramic composi-tion. During heating the metallic oxide and non-oxide components form a glassy grain boundary phase, which acts as a matrix into which the β-silicon nitride particles are embedded. Upon further heating or annealing the glassy phase is transformed into a crystalline grain boundary phase, which then provides the ceramic composition of this invention. It is to be understood that any remarks hereinafter to a glassy phase refer to the aforementioned glassy phase formed on densification prior to annealing.

Raw silicon nitride powders cannot be densified to high densities in the absence of densification aids. Thus, at least one densification aid is admixed with the silicon nitride starting powder in a manner described hereinbelow for the purpose of promoting densification of the silicon nitride during processing. The densification aids form a liquid phase into which the α-silicon nitride dissolves. The liquid phase forms at a temperature or over a temperature range which varies with the densification aid. The rate of mass transport of the α-silicon nitride is usually quite rapid in the liquid phase; thus, the silicon nitride density increases until a critical mass is reached and precipitation occurs.

Copending application, Ser. No. 07/398,801, filed Aug. 25, 1989, demonstrates that sources of barium, calcium, strontium, lithium, and sodium, or mixtures thereof, promote densification of silicon nitride. For the purposes of this invention the densification aid is required to include a source of strontium. Optionally, the densification aid may include a source of barium, calcium, lithium, or sodium. The sources of strontium and optional elements are suitably the corresponding oxides, but acceptable results are obtained with non-oxide derivatives, such as the corresponding acetates and carbonates. Oxides are the preferred source. The densification aid is beneficially strontium oxide alone or strontium oxide in combination with calcium oxide. Preferably, the densification aid is strontium oxide in combination with calcium oxide.

Any amount of a densification aid which promotes densification as described herein and produces the tough silicon nitride ceramic body of the invention is acceptable. The total amount of densification aid(s) is desirably present in an amount in the range from about 0.04 weight percent to about 10.0 weight percent, based on the total weight of the powder mixture. Preferably, the total amount of densification aid(s) is in the range from about 0.5 weight percent to about 9.8 weight percent, and more preferably, from about 0.9 weight percent to about 4.7 weight percent. If more than one densification aid is employed, the source of strontium is at least about 0.04 weight percent, preferably, at least about 0.8 weight percent, based on the total weight of the powder mixture. p In addition to a densification aid, the powder mixture must contain a conversion aid. The conversion aid at first forms a glassy grain boundary phase through which mass transport is, in general, considerably slower than in the densification aid. Thus, α-silicon nitride dissolves in the conversion aid on heating, but is not readily densified. Advantageously, however, the conversion aid promotes the rapid conversion of α-silicon nitride to predominantly β-silicon nitride. This conversion is most desirable because the β-silicon nitride in the form of elongated, single crystal whiskers or grains is responsible for the high fracture toughness and high fracture strength of the silicon nitride ceramic body of this invention. All references hereinafter to silicon nitride whiskers, single crystal whiskers and single crystal silicon nitride whiskers are intended to be synonymous and may be used interchange-ably. Any amount of conversion aid can be employed in the starting powder providing the quantity is sufficient to cause the conversion of the starting silicon nitride to predominantly β-silicon nitride, and is sufficient to produce the tough silicon nitride ceramic body of the invention. Preferably, the amount of conversion aid employed is in the range from about 0.2 weight percent to about 29.5 weight percent based on the total weight of the powder mixture. More preferably, the amount of conversion aid employed is in the range from about 1.0 weight percent to about 10.0 weight percent; most preferably, from about 1.7 weight percent to about 8.5 weight percent.

The conversion aid is suitably a source or derivative of an element selected from the group consisting of yttrium, lanthanum, cerium, neodymium, samarium, europium, gadolinium, terbium, dysprosium, holmium, erbium, ytterbium, and thorium, and mixtures thereof. For the purposes of this invention the source is suitably an oxide, but acceptable results are also obtained with non-oxide derivatives, such as the corresponding carbonates or acetates. Preferably, the conversion aid is a source or derivative of yttrium, dysprosium, or ytterbium. More preferably, the conversion aid is a source or derivative of yttrium, most preferably, yttrium oxide.

Surprisingly, the weight ratio of conversion aid to densification aid has been found to affect the fracture toughness of the finished ceramic, providing the whisker growth enhancing compound is also present in the powder mixture. Any weight ratio of conversion aid to densification aid is acceptable providing the fracture toughness shows an improvement over the fracture toughness value of 5 MPa (m)$^{\frac{1}{2}}$ for non-reinforced, monolithic silicon nitride. The weight ratio is suitably from about 0.25 to about 8. The weight ratio is beneficially in the range from about 0.5 to about 5; desirably, from about 1 to about 3; and, preferably, from about 1 to about 1.8. In the absence of a whisker growth enhancing compound, the conversion aid/densification aid weight ratio has no significant effect on the fracture toughness.

The third component required to be present in the powder mixture is a whisker growth enhancing compound. This compound helps to provide a ceramic body of superior fracture toughness and high strength. Just how the whisker growth enhancing compound contributes to the excellent physical properties which are observed in the silicon nitride ceramic body of this invention is not completely understood. It is possible that the whisker growth enhancing compound improves the viscosity of the glassy phase thereby facilitating the nucleation of elongated whiskers or grains of β-silicon nitride the latter being primarily responsible for the improved fracture toughness. The aforementioned theory is presented with the understanding that such a theory is not to be binding or limiting of the scope of the invention. Any amount of the compound in the starting powder is acceptable providing the amount is sufficient to promote the formation of β-silicon nitride whiskers, described hereinbelow, and sufficient to produce the tough silicon nitride ceramic body of this invention Preferably, the amount of the compound employed is in the range from about 0.01 weight percent to about 5 weight percent based on the total weight of the powder mixture. More preferably, the amount of whisker growth enhancing compound employed is in the range from about 0.1 weight percent to about 1.0 weight percent; most preferably, from about 0.2 weight percent to about 0.5 weight percent.

In U.S. Pat. No. 4,883,776, the presence of calcium, particularly calcium oxide, was found to provide advantages when silicon nitride powder compositions were formed by hot-pressing into finished ceramic bodies. Silicon nitride powders doped with up to about 5.3 weight percent calcium oxide were found to be desirable. It was believed that commercial silicon nitride powders contained only 100 ppm or less of calcium oxide.

An earlier application in this chain of applications, Ser. No. 07/297,627, filed Jan. 13, 1989, now abandoned, taught that elements of The Periodic Table of the Elements other than calcium also promoted growth of $\beta$-silicon nitride whiskers and provided hot-pressed silicon nitride ceramic bodies with a fracture toughness greater than about 6 MPa $(m)^{\frac{1}{2}}$, as measured by the Chevron notch technique, and a fracture strength in excess of 120 ksi (825 MPa). Satisfactory results were obtained with sodium, scandium, titanium and aluminum, or mixtures thereof among other elements. The foregoing elements, or mixtures thereof, were suitably added in the form of a derivative, e.g., an oxide, a boride, a carbide, a carbonitride, a nitride or an oxynitride, rather than in their elemental form. Lithium is also believed to be a suitable whisker forming agent. For the purposes of this invention, the whisker enhancing compound is desirably an oxide or non-oxide derivative of lithium, sodium, calcium, scandium, titanium or aluminum, or a mixture thereof. For this invention the non-oxide derivative is the corresponding acetate or carbonate. Preferably, the whisker enhancing compound is calcium oxide, sodium oxide, or aluminum oxide, more preferably, calcium oxide.

It is desirable to use whisker growth enhancing compounds and derivatives of strontium and yttrium in the form of powders which are pure and sufficiently small in size. Purity is not typically a problem, because commercially available materials used as whisker growth enhancing compounds, densification aids and conversion aids, particularly the oxide powders, generally contain less than 20 ppm each of assorted impurities. These levels of impurities are tolerable. Larger amounts of impurities, as for example in the 0.5 weight percent range, are not recommended as they may cause a change in the final ceramic composition and properties. A small powder particle size is favored, because dispersion is enhanced by smaller particles. Preferably, the oxide powders have an average particle size no greater than about 5 $\mu$m in diameter.

Certain elements, e.g., sodium and lithium, may be used as a densification aid, or a whisker growth enhancing compound in a given powder mixture. No single element may, however, be used in an amount sufficient to function as two or more of these functions, e.g., as both a densification aid and a conversion aid.

Silica is also required for the powder mixture of this invention. The function of the silica is to provide anionic silicate which counter-balances the positively charged metallic ions present in the crystalline grain boundary phase. All or part of the silica which is needed may be obtained from the silica present on the surface of the silicon nitride. Typically, however, the surface of the silicon nitride does not provide sufficient silica, and therefore a source of additional silica is needed. Suitable silica sources include quartz, fume silica and sol-gel silica. Any quantity of additional silica which provides for formation of the oxynitride crystalline grain boundary phase is acceptable. The actual quantity of added silica will vary depending upon the amounts of densification, conversion and whisker-formation aids which are present, and depending upon the silica content coating the surface of the silicon nitride. Typically, the total amount of silica, including silica present on the surface of the silicon nitride, is in the range from about 2.3 to about 6.0 weight percent, based on the total weight of the powder mixture. Preferably, the total amount of silica, including silica present on the surface of the silicon nitride, is in the range from about 3.0 to about 5.0 weight percent, based on the total weight of the powder mixture.

It has now been found that incorporation into the powder mixture of a Palmqvist toughness enhancing amount of at least one preformed reinforcing material improves properties of the resultant silicon nitride body. Properties which are improved include room temperature toughness and high temperature strength and stiffness. The material is selected from the group consisting of $\beta$-silicon nitride fibers or whiskers or silicon carbide, titanium carbide, boron carbide, titanium diboride, or zirconium oxide in at least one form selected from the group consisting of whiskers, fibers, particles and platelets.

The reinforcing material must be chemically compatible with both the glassy phase and the crystalline phases and their components. Chemically compatible materials are selected from the group consisting of boron carbide, silicon carbide, titanium carbide, zirconium oxide and titanium diboride. Materials which are normally chemically incompatible with the glassy phase and its components may be rendered compatible by coating them with one of the aforementioned chemically compatible elements. Normally incompatible materials include aluminum nitride, magnesium oxide and mullite. Titanium carbide provides a satisfactory coating for the latter group of materials.

The reinforcing material must be present in an amount which is sufficient to enhance the Palmqvist toughness of the resultant silicon nitride body without substantially interfering with or eliminating the formation of elongated silicon nitride grains. The reinforcing material, when present, occupies space in the silicon nitride phase in which elongated silicon nitride grains would otherwise grow in its absence. The amount of reinforcing material varies with the size of reinforcing material pieces, particles, fibers or whiskers as well as the volume occupied by the reinforcing material. Polycrystalline fibers provide acceptable results as a nominally continuous reinforcing material. Single crystal whiskers also provide acceptable results, albeit as a nominally discontinuous reinforcing material.

As a general rule, a given volume percentage of large particles, fibers, etc., will interfere less with formation of the elongated silicon nitride grains than an equal volume percentage of smaller particles, etc. Accordingly, satisfactory results are obtained with any of the following combinations of reinforcement material diameter and volume percentages, based upon glassy phase volume: (a) less than 0.2 $\mu$m diameter, up to about 10 volume percent; (b) from 0.2 $\mu$m to about 0.5 $\mu$m diameter, up to about 15 volume percent; (c) from 0.5 $\mu$m to about 1.5 $\mu$m diameter, up to about 25 volume percent;

(d) from 1.5 μm to about 2.5 μm diameter, up to about 30 volume percent; (e) from 2.5 μm to about 5.0 μm diameter, up to about 35 volume percent; (f) from 5.0 μm to about 15.0 μm diameter, up to about 45 volume percent; (g) from 15.0 μm to 25.0 μm diameter, up to about 50 volume percent; and (h) greater than 25.0 μm diameter, up to about 65 volume percent. Irrespective of the reinforcing material diameter, the amount of reinforcing material, where used, is beneficially greater than about 5 volume percent. The reinforcing materials have different densities. As such, a universal weight percentage is not applicable. The weight percentages corresponding to the foregoing volume percentages are readily determined given the density of a particular reinforcing material.

In the process of this invention, it is required to mix the starting silicon nitride powder, described hereinabove, with a combination of a densification aid, a conversion aid, a whisker growth enhancing compound and, optionally, silica and/or a reinforcing material to obtain a powder mixture, which is used in preparing the tough silicon nitride ceramic body of this invention. The reinforcing material, when present, is beneficially added to the remaining components of the powder mixture after they are well mixed to minimize breakage or comminution of reinforcement material pieces, etc. Suitable densification aids, conversion aids and whisker growth enhancing components are disclosed hereinabove. Ordinarily, the total quantity of the derivative of strontium densification aid, yttrium conversion aid and the whisker growth enhancing compound is no greater than about 35 weight percent of the total weight of the powder mixture. The 35 weight percent limit is also appropriate when a reinforcing material is used. The total quantity will depend, however, on probable end use applications for fired ceramics prepared from the powder mixture. For some applications, total quantities in excess of 35 weight percent will provide acceptable results. Preferably, however, the total quantity is in the range from about 5 weight percent to about 35 weight percent for medium temperature and/or the highest fracture toughness applications. By "medium temperature," it is meant temperatures in the range from about 900° C. to about 1200° C. Ceramic cutting tools are an example of a medium temperature and very high fracture toughness application. Preferably, the total quantity is in the range from about 0.25 weight percent to about 5 weight percent for high temperature and/or moderately high fracture toughness applications. By "high temperature," it is meant temperatures from about 1200° C. to about 1400° C. Parts for ceramic engines are an example of a high temperature and moderately high fracture toughness application.

The preparation of the powder mixture containing silicon nitride, densification aid(s), conversion aid(s), whisker growth enhancing compound(s), and optionally, silica is accomplished in any suitable manner. Ball-milling of the components in powder form is one acceptable manner of preparation.

The preferred method of preparing the powder mixture comprises use of an attritor with zirconia balls to prepare a finely-divided suspension of silicon nitride and a powdered combination of the densification aid(s), the conversion aid(s), the whisker growth enhancing compound(s), and optionally, additional silica in a carrier medium, drying an admixture of the suspension and the attritor balls, beneficially after removing, by filtration or otherwise, excess carrier medium, and thereafter separating the attritor balls to obtain the powder mixture.

The preparation of the finely-divided suspension of silicon nitride and the combination of the densification aid(s), the conversion aid(s), the whisker growth enhancing compound(s), and optionally, additional silica in a carrier medium requires no particular order of addition of the components. For example, it is possible to add the powdered combination or powdered components thereof to a colloidal suspension of silicon nitride in a carrier medium or vice versa. Alternatively, all components of the powder mixture may be added simultaneously to the carrier medium prior to attritor milling. The latter method is preferred, particularly when an organic carrier medium such as toluene or an alcohol is employed.

The carrier medium may be any inorganic or organic compound which is a liquid at room temperature and atmospheric pressure. Examples of suitable carrier media include water; alcohols, such as methanol, ethanol and isopropanol; ketones, such as acetone and methyl ethyl ketone; aliphatic hydrocarbons, such as pentanes and hexanes; and aromatic hydrocarbons, such as benzene and toluene. The carrier medium is desirably an organic liquid, preferably toluene or an alcohol such as methanol. The function of the carrier medium is to impart a viscosity suitable for mixing to the solid powders. Any quantity of carrier medium which achieves this purpose is sufficient and acceptable. Preferably, a quantity of carrier medium is employed such that the solids content is in the range from about 20 volume percent to about 50 volume percent. More preferably, a quantity of carrier medium is employed such that the solids content is in the range from about 35 volume percent to about 45 volume percent. Below the preferred lower limit the viscosity of the solid suspension may be too low and the deagglomeration mixing may be ineffective. Above the preferred upper limit the viscosity may be too high, and the deagglomeration mixing may be difficult.

The components of the powdered combination are added to the carrier medium in any manner which gives rise to a finely dispersed suspension of the components. Typically, the process is conducted in a large vessel at room temperature (taken as 23° C.) under air with vigorous stirring. Any common stirring means is suitable, such as a ball-milling device or an attrition mixer. An ultrasonic vibrator may be used in a supplementary manner to break down smaller agglomerates. The attrition mixer is preferred.

To aid in the dispersion of components of the powder mixture, optionally one or more surfactants or dispersants can be added to the suspension. The choice of surfactant(s) or dispersant(s) can vary widely as is well-known in the art.

If the carrier medium is toluene, a coupling agent, such as an aluminate coupling agent commercially available from Kenrich Petrochemicals under the trade designation KEN-REACT KA 322, may be used to aid in forming a suspension. When using an alcohol such as methanol, a dispersant such as a polyethyleneimine may be used to facilitate mixing and a flocculant such as oleic acid may be used to ease recovery of the powder mixture.

Any amount of surfactant or dispersant is acceptable providing dispersion of powder mixture components is improved. Typically, the amount of surfactant is in the range from about 0.01 to 1.0 weight percent of the powder mixture.

The finely-divided suspension is now ready for processing into greenware. For example, the suspension can be slip-cast by techniques well-known in the art for eventual sintering. Alternatively, the suspension can be dried into a powder and ground for use in hot-pressing processes. Drying is accomplished by standard drying means, such as by spray-drying or oven drying under a nitrogen purge. Preferably, drying of the admixture of the powder mixture and the attritor balls is accomplished in an oven under a nitrogen purge after removal of excess carrier medium. During the drying process, additional free carrier medium is removed. The temperature of the drying depends on the boiling point of the carrier medium employed. Typically, the drying process is conducted at a temperature just below the boiling point of the carrier medium under atmospheric pressure. Preferably, the carrier medium is toluene or an alcohol and the temperature of drying is about 50° C. After drying, the resulting powder is separated from the attritor balls and sieved through a screen to obtain a powder having a maximum agglomerate diameter of about 100 μm. The screen size is usually less than about 60 mesh (250 μm); more preferably, less than about 80 mesh (180 μm). The powder which is obtained on sieving is the powder mixture which is used in the hot-pressing process of this invention.

When reinforcing materials are included in the powder mixture, the foregoing procedure is modified depending upon the form of the reinforcing material. If the reinforcing material is in a form other than long or continuous fibers, the reinforcing material is added to the finely dispersed suspension of components and mixed or attrited for a suitable length of time. Attrition time largely depends upon a balancing of the extent of reinforcing material agglomeration with its friability or fragility. In other words, attrition time is long enough to break up most, if not all, of the agglomerates. It is also short enough to maintain sufficient reinforcing material integrity to provide a desired degree of reinforcement. The additional attrition time will also depend upon the reinforcing material. A typical time needed to accomplish dispersion of the reinforcing material will vary from about 10 minutes to about 45 minutes. The time is beneficially from about 10 to about 20 minutes. If the reinforcing material is in the form of fibers, also known as continuous fibers, no additional attrition time is required. The fibers are suitably immersed in the finely dispersed suspension to deposit a coating of the suspension on their outer surface. The fibers are then removed from the suspension and dried before further processing. If desired, multiple coatings may be applied in this manner. The dried, coated fibers, whether in the form of single fibers or a fiber mat or fabric, are beneficially surrounded by the powder mixture in a hot-pressing die and then hot-pressed as described herein. Other known methods of processing fibers may also be used.

Any method for processing the powder mixture is acceptable, including hot-pressing (HP), hot isostatic pressure (HIP), and pressureless sintering. The typical method is by hot-pressing (HP) or hot isostatic pressure (HIP), which comprises heating the powder under pressure to obtain the densified ceramic body. Any standard hot-pressing equipment is acceptable, such as a graphite die equipped with a heating means and a hydraulic press. Particularly suitable results are obtained when the die is fabricated from a material which is substantially non-reactive with components of the powder mixture at hot-pressing temperatures and has a mean linear coefficient of expansion greater than silicon nitride. The use of such a die material aids in the preparation of near net shapes without post-densification machining operations. The die material is desirably titanium carbide. R. Morrell, Handbook of Properties of Technical and Engineering Ceramics, pages 82-83 (1985), lists the mean linear coefficients respectively for silicon nitride and titanium carbide as $3.6 \times 10^{-6}$ $K^{-1}$ and $8.2 \times 10^{-6}$ $K^{-1}$. The hot-pressing is conducted under an inert atmosphere, such as nitrogen, to prevent the oxidation and decomposition of silicon nitride at high temperatures. The direction of pressing is uniaxial and perpendicular to the plane of the die plates.

Any processing temperature and pressure will suffice providing the novel silicon nitride ceramic of this invention, described hereinbelow, is obtained. Typically, however, the temperature must be carefully controlled, because the elongated β-silicon nitride whiskers are found to form in a narrow temperature range. Preferably, the temperature is maintained during pressurizing in the range from about 1700° C. to about 1870° C. More preferably, the temperature is maintained in the range from about 1750° C. to about 1850° C. Most preferably, the temperature is maintained in the range from about 1800° C. to about 1840° C. Below the preferred lower temperature limit the formation of elongated β-silicon nitride whiskers may be retarded. Above the preferred upper temperature limit the silicon nitride may decompose, and special pressure equipment may be required to conduct the densification. In the absence of a reinforcing material, the use of high pressure techniques such as hot isostatic pressing may allow use of higher temperatures, e.g. up to 2000° C. or even 2100° C. It is noted that the accurate measurement of high temperatures, such as those quoted hereinabove, is technically difficult. Some variation in the preferred temperature range may be observed depending on the method employed in measuring the temperature. The preferred temperatures of this invention are measured by use of a tungsten-rhenium thermocouple, obtained from and calibrated by the Omega Company.

While the pressure during hot-pressing is important, it is not quite as critical a parameter as temperature. Typically, the pressure should be sufficient to cause densification of the green body. Preferably, the pressure is in the range from about 3000 psig to about 6000 psig; more preferably, from about 4000 psig to about 5500 psig; most preferably, about 4500 psig to about 5200 psig. Below the preferred lower pressure limit the powder will not be sufficiently densified. Above the preferred upper pressure limit the powder will densify in a shorter time and at a lower temperature. Although less rigorous processing conditions seem on the surface to be desirable, the formation of elongated β-silicon nitride crystals may be inhibited at lower temperatures and shorter pressing times.

The amount of time that the powder mixture is heated under pressure should be sufficient to bring the powder to essentially complete densification. Generally, ram movement is a good indicator of the extent of densification. As long as the ram continues to move, the densification is incomplete. When the ram has stopped moving for at least about 15 minutes, the densification is essentially complete at about 99 percent or greater of the theoretical value. Thus, the time required for hot-pressing is the time during ram movement plus about an additional 15 to 30 minutes. Preferably, the time is in the range from about 15 minutes to about 2 hours; more preferably, from about 30 minutes to about 90 minutes; most preferably, about 45 minutes to about 75 minutes.

As noted hereinabove, the aforementioned application of heat and pressure gives rise to a glassy grain boundary phase. In the process of this invention, the densified ceramic is heated further to convert the glassy grain boundary phase into a crystalline grain boundary phase. The heating which promotes this conversion is known to those skilled in the art as "annealing." Crystallization is typically carried out by placing the ceramic in a graphite receptacle, which is thereafter heated in a silicon nitride powder bed under flowing nitrogen for a time sufficient to produce the crystalline grain boundary phase. Preferably, the annealing temperature is in a range from about 1000° C. to about 1550° C., more preferably in the range from about 1250° C. to about 1500° C., most preferably from about 1350° C. to about 1450° C., while the annealing time ranges widely from about 2 hours to about 100 hours depending upon the sample size and the annealing temperature. The annealing procedure may be repeated one or more times, as desired.

The densification and annealing methods, described hereinbefore, allow for the formation of silicon nitride ceramic articles which can be used as cutting tools. A variety of shapes can be made by hot-pressing, one common shape being a flat plate. These plates may range in size from about 2 inches in length by about 1.5 inches in width by about 0.45 inch in thickness to about 16 inches (40.6 cm) in length by about 16 inches (40.6 cm) in width by about 1.0 inch (2.5 cm) in thickness. Smaller and larger plates can also be fabricated, as determined by the size of the hot-pressing plaques. Cutting tools can be fabricated by slicing and grinding these plates into a variety of cutting tool shapes.

Crystallization of the grain boundary phase does not significantly alter the room temperature physical and material properties, such as density, weight, dimensions, hardness, and toughness, of the ceramic. Typically, the density and weight changes are less than 0.5 percent on crystallization of the grain boundary phase. This implies that the volume or dimensional changes are also less than 0.5 percent. The hardness and toughness of the material having a crystalline grain boundary phase are also roughly the same as, or not more than 5 percent less than, similar silicon nitrides having a glassy grain boundary phase described in the co-pending applications noted hereinbefore.

The silicon nitride ceramic body which is produced by the process of this invention is a dense material having no significant porosity. Preferably, densification proceeds to greater than 95 percent of the theoretical value; more preferably, to greater than 97 percent of the theoretical value; most preferably, to greater than 99 percent of the theoretical value. Moreover, as measured by X-ray diffraction, the silicon nitride is present predominantly in the beta crystalline form in combination with a lesser amount of the alpha form. Preferably, the alpha form is present in an amount less than about 30 weight percent based on total silicon nitride, more preferably, less than about 10 weight percent. Quite unexpectedly, the β-silicon nitride is present predominately as single crystal, "needle-like" whiskers or elongated grains, as determined by both scanning electron microscopy (SEM) and transmission electron microscopy (TEM). The size of the hexagonal β-silicon nitride grains is usually in the range from about 1 μm to about 20 μm in length with a mean diameter in the range from about 0.2 μm to about 1.5 μm; preferably from about 3 μm to about 10 μm in length with a mean diameter from about 0.3 μm to about 1.0 μm.

Since the whiskers are oriented randomly, it is difficult to determine exactly the percentage of silicon nitride which exists as whiskers, as opposed to equiaxed particles. The measurement is made by viewing one plane of the silicon nitride ceramic in a scanning electron microscope (SEM) and measuring the percentage by volume occupied by whiskers having an aspect ratio between 2 and 16. It is observed that the whiskers are homogeneously distributed and randomly oriented throughout the ceramic body, and that the volume occupied by the whiskers is approximately the same in all planes. Typically, the percentage of silicon nitride whiskers having an aspect ratio of between 2 and 16 is at least about 20 volume percent as measured in a plane. Preferably, the percentage of silicon nitride whiskers having an aspect ratio between 2 and 16 is at least about 35 volume percent as measured in a plane. Unexpectedly, the whiskers are found to have a high average aspect ratio. Typically, the average aspect ratio of the silicon nitride whiskers is at least about 2.5; preferably, at least about 5.5. It is noted that because the aspect ratio is measured in a plane, the average aspect ratio is a lower bound. For example, a whisker which is perpendicular to the plane may have an apparent aspect ratio of less than 2; whereas the true aspect ratio may be very much greater than 2.

As a result of the additional annealing step in the process of this invention, a crystalline grain boundary phase is obtained having an oxynitride apatite structure, as determined by X-ray diffraction analysis. The crystallinity of the grain boundary phase is desirably greater than about 90 volume percent, based on the total volume of the grain boundary phase. Preferably, the crystallinity of the grain boundary phase is greater than about 95 volume percent, more preferably, greater than about 99 volume percent, based on the total volume of the grain boundary phase.

The crystalline grain boundary phase can be represented by the following general formula:

$$A_xB_{10-x}[Si(O,N)_4]_6O,N)_y$$

wherein A is strontium, optionally, in combination with calcium, barium, sodium, scandium, lithium, titanium, aluminum, or mixture thereof; B is yttrium, lanthanum, cerium, neodymium, samarium, europium, gadolinium, terbium, dysprosium, holmium, erbium, ytterbium, or thorium, or a mixture thereof: x is a positive number greater than 0 and less than or equal to about 4: and y is a positive number ranging from 0 to about 2 If "A" is strontium in combination with calcium, barium, sodium, scandium, lithium, titanium, or aluminum, the total equivalents present per molecular formula are "x." It is noted that the portions of the formula reading "(O,N)4" and "(O,N)y" refer to a combination of oxide and nitride, the combined total of which is equal to 4 or y equivalents, accordingly. Preferably, the crystalline phase is a strontium-calcium-yttrium silicon oxynitride, wherein A is strontium and calcium, B is yttrium, x is a positive number from 2 to 4, and y is a positive number from 0 5 to 1.5. More preferably, the crystalline phase is $(Ca,Sr)_3Y_7[Si(O,N)_4]_6(O,N)$.

Small quantities of other phases may be present in the ceramic in a total amount not exceeding about 1 weight percent, and typically not exceeding about 0.4 weight percent.

The mechanical properties of the self-rein-forced silicon nitride ceramic body are readily measured by use of standard tests In particular, fracture toughness (KIC) is measured according to the Chevron notch and the Palmqvist methods described hereinafter. Fracture strength (modulus of rupture) is measured according to the Military Standard 1942b test. Hardness is measured according to the Vickers indentation test.

Fracture strength (modulus of rupture) measures the resistance of the material to fracture under a steady load. Fracture strength is defined as the maximum unit stress which the material will develop before fracture occurs. Test bars are prepared by cutting rectangular bars (45 mm×4 mm×3 mm) of the silicon nitride ceramic in a plane perpendicular to the pressing direction. The bars are ground on the surfaces parallel to the pressing plates using a 500 grit grinding wheel (Military Standard 1974). The fracture strength is measured at room temperature and at elevated temperatures using a 4-point bend test with 20 mm span and crosshead speed of 0.5 mm/min. Typically, the fracture strength at room temperature is at least about 650 MPa. Preferably, the fracture strength at room temperature ranges from about 825 MPa to about 1250 MPa; more preferably, from about 900 MPa to about 1100 MPa. Typically, at 1000° C. the fracture strength is at least about 650 MPa. Typically, at 1375° C. the fracture strength is at least about 350 MPa.

Toughness indicates the resistance of the material to fracture under a dynamic load. More specifically, fracture toughness is defined as the maximum amount of energy which a unit volume of material will absorb without fracture. In the present invention two methods are employed to measure fracture toughness. The first of these is the Chevron notch test. Test bars are prepared as described hereinabove, and additionally scored with a Chevron notch. The test bars are then subjected to a 3-point bend test with 40 mm span and crosshead speed of 0.01 mm/min. Typically, the fracture toughness of the silicon nitride ceramic body of this invention, as measured at room temperature (taken as 23° C.) by the Chevron notch technique, is greater than about 6 MPa (m)$^{\frac{1}{2}}$. Preferably, the room temperature fracture toughness is greater than about 7 MPa (m)$^{\frac{1}{2}}$; more preferably, greater than about 8 MPa (m)$^{\frac{1}{2}}$.

In the evaluation of cutting tool materials it is useful to measure the Palmqvist toughness and the Vickers hardness. Both measurements can be made simultaneously on one test sample, and therefore these tests are very convenient.

The Vickers hardness test measures the resistance of the ceramic material to indentation. A sample, approximately 1 cm in length by 1 cm in width by 1 cm in height, is placed on a flat surface, and indented with a standard Vickers diamond indentor at a crosshead speed of 0.5 mm/min. The Vickers hardness number is calculated from the applied load, in this case 14 kg, and the cross-sectional area of the indentation. Prior to making the test, the test sample is polished in a special manner First, the sample is cleaned and rough spots are flattened by use of a 220-grid diamond wheel. Next, a 45-micron diamond wheel is used to start the polishing. Next, the sample is treated to a series of polishings at 30 psi and 200 rpm in the following consecutive manner: three five-minute intervals with 30-micron diamond paste, three five-minute intervals with 15-micron diamond paste, three five-minute intervals with 6-micron diamond paste, two five-minute intervals with 1-micron diamond paste, and one five-minute interval with 0.25-micron diamond paste. Between each interval the sample is thoroughly cleansed by washing with water and sonicating for two 148 minutes. The Vickers hardness number of the silicon nitride ceramic of this invention is at least about 1325 kg/mm$^2$ at room temperature. Preferably, the Vickers hardness number ranges from about 1400 kg/mm$^2$ to about 1700 kg/mm$^2$ at room temperature; more preferably, from about 1575 kg/mm$^2$ to about 1675 kg/mm$^2$.

The Palmqvist toughness test is an extension of the Vickers test (See S. Palmqvist in *Jerndontorets Annalen*, 141 (1957), 300, for a description of the Palmqvist toughness test.) The test sample is prepared and indented as in the Vickers test, but the 14-kg load is additionally held for 15 seconds. The sample cracks. The measurements of the indented diagonals and the crack lengths are made on a Nikon UM2 microscope at 1000x magnification. The Palmqvist toughness (W) is directly proportional to the applied load (P) and inversely proportional to the crack length (L). Preferably, the silicon nitride ceramic body of this invention exhibits a Palmqvist toughness at room temperature of at least about 37 kg/mm. Preferably, the silicon nitride ceramic body of this invention exhibits a Palmqvist toughness at room temperature in the range from about 37 kg/mm to about 50 kg/mm; more preferably, from about 40 kg/mm to about 45 kg/mm.

ILLUSTRATIVE EMBODIMENTS

The following examples serve to illustrate the novel self-reinforced silicon nitride composition of this invention and the method of preparing the same. The examples are not intended to be limiting of the scope of this invention. All percentages are weight percent unless otherwise noted.

EXAMPLE E-1 (a-i)

The silicon nitride powder is commercially available from Ube industries, Ltd. under the trade designation SN-E10. It contains 1.19 percent oxygen, less than 100 ppm Cl, less than 100 ppm Fe, less than 50 ppm Ca, and less than 50 ppm Al. It has a crystallinity of greater than 99.5 percent, a ratio of $\beta/(\alpha+\beta)$ of less than 5, and a surface are of 11.2 m$^2$/g. Alfa Products supplies SrO and silica. Moly Corp supplies Y$_2$O$_3$, and Baker Incorporated supplies CaO.

The materials are mixed in an attritor (Union Process batch attritor, Model 01HD - 750 cc capacity with polytetrafluoroethylene coated tube and stirrer) containing zirconia balls with a stirring rate of 330 revolutions per minute (rpm). A mixture of 225 ml toluene and 25 drops of an aluminate coupling agent, commercially available from Kenrich Petrochemicals under the trade designation Kenreact Ka 322, is used as a mixing medium. The silicon nitride powder (221.3 g), strontium oxide powder (88 g), yttrium oxide powder (16 g), calcium oxide powder (0.5 g), and silicon oxide powder (3.5 g) are added to the mixing medium and agitation is started. After about thirty minutes of mixing, an additional 100 ml of toluene is added and the agitation stirring rate is increased to 630 rpm for a period of two minutes to thin the mixture before removing it from the attritor together with the zirconia balls. Excess toluene is removed by vacuum filtration. The mixture is then dried under a flow of dry nitrogen gas. After drying, the mixture is separated from the zirconia balls using a 30 mesh stainless steel sieve and subsequently passed through 40 mesh and 60 mesh stainless steel sieves to provide a dried powder mixture composed of 88.5 percent by weight silicon nitride, 3.5 percent strontium oxide, 6.4 percent yttrium oxide, 0.2 percent calcium oxide, and 1.4 percent silicon oxide.

The powder mixture (80 g), described hereinabove, is poured into a graphite die in the shape of plates measuring 2 inches in length by 1.5 inches in width by 0.5 inches in depth. A pressure of 1000 psig is applied to the die, while the temperature is raised from ambient to about 1200° C. in about 30 minutes. At about 1200° C. the pressure is gradually increased to 5000 psig and maintained thereat. The temperature is then increased to 1825° C. over a 40-minute period. The die is maintained at 1825° C. and a pressure of 5000 psig for 60 minutes. Afterwards the die is cooled over a 2 hour period to 100° C. At 1500° C. the pressure is slowly released. When the die reaches room temperature, it is opened, and a silicon nitride ceramic body in the shape of a plate having the above-identified dimensions is retrieved.

Samples of the ceramic plate prepared hereinabove are placed in a graphite crucible, which is thereafter placed in a silicon nitride powder bath. The samples are annealed at a variety of temperatures ranging from 1250° C. to 1550° C. for a variety of annealing times ranging from 2 hr to 100 hr, as noted in Table I.

grain boundary phase. The microstructure of the silicon nitride ceramic, prepared hereinabove, is determined by scanning electron microscopy (SEM), as viewed in a plane. About 35 volume percent of the silicon nitride appears in the form of elongated whiskers having an aspect ratio ranging from 2 to 16. The average aspect ratio is 5.6.

The Palmqvist toughness of the above-identified silicon nitride ceramic bodies measured at room temperature is set forth in Table I, as is the Vickers hardness measured at room temperature and under a 14-kg load, and the fracture strength measured at 1375° C. by the 4-point bend technique. The Palmqvist toughness, Vickers hardness, and fracture strength of an "as hot-pressed" sample, that is, without annealing is also set forth in Table I.

It is seen that the samples E-1(a–e) which are annealed at 1350° C. for a time ranging from 2 to 100 hours show a slightly lower Vickers hardness than the hot-pressed sample with no annealing. Advantageously, however, these samples show within experimental error no significant decrease in Palmqvist toughness up to 50 hours of annealing time, when compared with the hot-pressed sample with no annealing. It is further seen that samples E-1(h–i) which are annealed for 50 hours at a temperature of 1450° C. or 1550° C. show roughly the same hardness as the hot-pressed sample with no annealing. (Sample E-1f which is annealed for 50 hr at 1250° C. exhibits a lower hardness than the hot-pressed sample having no annealing for reasons which are not understood.) Advantageously, however, Samples E-1(f–i)

TABLE I [1] [4]

| Sample | Annealing Temp. [2] (°C.) | Annealing Time [2] (hr.) | Vickers Hardness (Kg/mm$^2$) | Palmqvist Toughness (Kg/mm) | Phases [3] | Fracture Strength (MPa) |
|---|---|---|---|---|---|---|
| As hot-pressed | NA | NA | 1681 ± 25 | 44.5 ± 1.8 | β, α, G | 285 ± 19 |
| E-1a | 1350 | 2 | 1610 ± 35 | 43.5 ± 3.1 | β, α, A | — |
| E-1b | 1350 | 5 | 1651 ± 24 | 40.9 ± 1.2 | β, α, A | — |
| E-1c | 1350 | 10 | 1595 ± 33 | 41.0 ± 1.8 | β, α, A | — |
| E-1d | 1350 | 50 | 1634 ± 0 | 42.2 ± 2.2 | β, α, A | — |
| E-1e | 1350 | 100 | 1608 ± 40 | 37.3 ± 2.1 | β, α, A | — |
| E-1f | 1250 | 50 | 1556 ± 0 | 48.0 ± 2.8 | β, α, A | — |
| E-1g | 1450 | 1 | 1591 ± 40 | 44.3 ± 4.6 | β, α, A | — |
| E-1h | 1450 | 50 | 1626 ± 18 | 42.3 ± 3.5 | β, α, A | 360 ± 18 |
| E-1i | 1550 | 50 | 1643 ± 19 | 42.7 ± 1.7 | β, α, A | 374 ± 5 |

[1] Samples are hot-pressed at 1825° C. for 1 hr. before annealing.
[2] NA means not applicable, because the sample was not annealed.
[3] Phases: β-Si$_3$N$_4$, α-Si$_3$N$_4$. "A" for oxynitride apatite, and "G" for a glassy phase. E-1g shows trace of an unidentified fourth phase.
[4] Vickers hardness and Palmqvist toughness measured at room temperature; Fracture strength measured at 1375° C.

After annealing, in addition to α-Si$_3$N$_4$ and β-Si$_3$N$_4$, a second crystalline phase is present having an oxynitride apatite structure characterized as (Ca,Sr)$_3$Y$_7$[Si(O,N)$_4$]$_6$(O,N).

The densities of the silicon nitride ceramic bodies, prepared hereinabove, with and without annealing are measured by the water immersion method, as described in "Modern Ceramic Engineering" by D. W. Richerson, Marcel Dekker, 1982. The densities are 3.29 g/cc or very close thereto, which is essentially 100 percent of theoretical, and therefore the materials are essentially nonporous. Silicon nitride is present predominantly as β-Si$_3$N$_4$, as determined by X-ray diffraction, with less than or about 30 percent as residual α-Si$_3$N$_4$. The bulk chemical composition of the annealed ceramic is determined by stereology analysis from SEM photomicrographs and is found to contain about 90 volume percent silicon nitride and about 10 volume percent crystalline exhibit a Palmqvist toughness which is similar to the hot-pressed control sample. The results generally indicate that the silicon nitride ceramics of this invention having a crystalline oxynitride apatite grain boundary phase possess a Palmqvist toughness at room temperature which is comparable to the hot-pressed sample without annealing having a glassy grain boundary phase. Most advantageous, when the fracture strength measured at 1375° C. of two annealed samples (E-1h and E-1i) are compared with the fracture strength of the "as hot-pressed" sample, it is seen that the fracture strength of the annealed samples is significantly higher than that of the "as hot-pressed" sample.

EXAMPLE E-2 (a-f)

A powder composition is prepared and hot pressed into plates as in Example 1, with the exception that the hot pressing is conducted at 1875° C. for 1 hour. The plates are annealed at a variety of temperatures ranging from 1250° C. to 1450° C. for a variety of annealing temperatures ranging from 1 hr to 50 hr with the results set forth in Table II.

Seven powder compositions are prepared with the compositions shown in Table III and hot pressed, following the procedure described in Example 1.

TABLE III [1]

| Ex. E-3 | $Si_3N_4$ Wt. % | Mole Ratio of Additives (Normalized to Ca, Sr oxides) | | | Vickers Hardness (kg/mm$^2$) | | Palmqvist Toughness (kg/mm) | |
|---|---|---|---|---|---|---|---|---|
| | | (Ca,Sr) Oxides | :$M_2O_3$ (M) | :$SiO_2$ [2] | Not Annealed | Annealed | Not Annealed | Annealed |
| a | 88.51 | 1 | 0.75(Y) | 1.50 | 1681 ± 23 | 1634 ± 0 | 44.5 ± 1.8 | 42.2 ± 2.2 |
| b | 91.03 | 1 | 0.75(Y) | 1.50 | 1590 ± 29 | 1576 ± 21 | 42.0 ± 0.9 | 41.5 ± 1.1 |
| c | 94.88 | 1 | 0.75(Y) | 1.50 | 1556 ± 0 | 1533 ± 25 | 41.9 ± 1.9 | 41.3 ± 0.9 |
| d | 89.30 | 1 | 0.70(Y) | 1.65 | 1512 ± 41 | 1415 ± 19 | 48.6 ± 2.1 | 46.0 ± 1.2 |
| e | 89.60 | 1 | 1.0(YB) | 1.56 | 1603 ± 21 | 1576 ± 28 | 40.8 ± 1.2 | 40.2 ± 0.9 |
| f | 90.00 | 1 | 1.0(Dy) | 1.56 | 1548 ± 17 | 1526 ± 31 | 41.3 ± 2.1 | 39.8 ± 0.4 |
| g [4] | 87.60 | 1 | 0.95(Dy) | 1.52 | 1750 ± 45 | 1634 ± 0 | 39.3 ± 1.6 | 40.5 ± 1.4 |

[1] Samples (a) and (b) are hot-pressed at 1825° C. for 1 hr. Samples (c)-(g) are hot-pressed at 1875° C. for 1 hr. Annealed samples are heated at 1350° C. for 50 hours after hot-pressing.
[2] Includes surface silica from $Si_3N_4$ powder.
[3] Sample includes 2.67 weight percent aluminum nitride.

TABLE II [1]

| Sample | Annealing Temp. [2] (°C.) | Annealing Time [2] (hr.) | Vickers Hardness (Kg/mm$^2$) | Palmqvist Toughness (Kg/mm) | Phases [3] |
|---|---|---|---|---|---|
| As hot-pressed | NA | NA | 1541 ± 21 | 43.9 ± 1.5 | β, G |
| E-1a | 1350 | 2 | 1483 ± 51 | 44.2 ± 2.5 | β, A |
| E-1b | 1350 | 5 | 1651 ± 24 | 40.9 ± 1.2 | β, A |
| E-1c | 1350 | 10 | 1504 ± 33 | 46.5 ± 1.5 | β, A |
| E-1d | 1450 | 1 | 1389 ± 59 | 45.5 ± 7.1 | β, A |
| E-1e | 1450 | 50 | 1520 ± 66 | 42.9 ± 1.6 | β, A |
| E-1f | 1250 | 50 | 1434 ± 33 | 47.3 ± 5.6 | β, A |

[1] Samples are hot-pressed at 1875° C. for 1 hr. before annealing.
[2] NA means not applicable, because the sample was not annealed.
[3] Phases include β-$Si_3N_4$, "A" for oxynitride apatite, and "G" for a glassy phase. No α-$Si_3N_4$ is observed.

It is seen that at a hot pressing temperature of 1875° C. essentially all of the silicon nitride is converted to the beta crystalline form, with no alpha phase remaining. It is further seen that the oxynitride apatite crystalline phase forms on annealing despite the absence of α-$Si_3N_4$. Thus, when Examples E-1(a-i) and E-2(a-f) are compared, it is concluded that the crystallization of the oxynitride apatite phase does not depend upon the presence or absence of an α-$Si_3N_4$ phase. Moreover, the Palmqvist toughness of the E-1 samples containing alpha phase is similar to the toughness of the corresponding E-2 samples without alpha phase, that is, where the samples being compared are annealed at identical temperatures and times. It can be concluded, therefore, that the Palmqvist toughness is not dependent upon the presence or absence of α-$Si_3N_4$ at concentrations of α-$Si_3N_4$ less than 30 weight percent.

EXAMPLE E-3 (a-g)

The Vickers hardness and Palmqvist toughness of the samples described in Table III are measured at room temperature. The samples are annealed at 1350° C. for 50 hours. It is observed from X-ray diffraction measurements that the annealed samples E-3 (a-g), which cover a wide range of composition, possess a crystalline grain boundary phase corresponding to an oxynitride apatite structure. The hardness and fracture toughness of the annealed samples are measured at room temperature with the results shown in Table III. It is observed that the Palmqvist toughness values of the annealed samples are close to the Palmqvist values of the corresponding samples which are not annealed, whereas the hardness values of the annealed samples are slightly, but not significantly, lower than the hardness values of the corresponding samples which are not annealed. It can be generally concluded that the physical properties of the annealed samples, measured at room temperature, compare favorably with the physical properties of the corresponding non-annealed samples.

EXAMPLE E-4 (a-f)

Six powder mixtures having the compositions shown in Table IV are prepared according to the procedure of Example 1, with the exception that silicon carbide is added to each composition as a pre-formed reinforcing material.

TABLE IV [1]

| Ex. E-4 | $Si_3N_4$ Wt. % | $Y_2O_3$ Wt. % | SrO Wt. % | CaO Wt. % | $SiO_2$ [2] Wt. % | SiC Reinforcing Material Wt. % | Form [3] | Phases [4] Not Annealed | Annealed |
|---|---|---|---|---|---|---|---|---|---|
| a | 80.013 | 5.506 | 3.197 | 0.172 | 1.052 | 10.061 | particles | β, α, SiC | β, α, SiC, A |
| b | 79.787 | 5.756 | 3.185 | 0.174 | 1.077 | 10.024 | particles | β, α, SiC | β, α, SiC, A |
| c | 71.411 | 5.167 | 2.877 | 0.154 | 0.710 | 20.246 | particles | β, α, SiC | β, α, SiC, A |

TABLE IV [1] -continued

| Ex. E-4 | Si$_3$N$_4$ Wt. % | Y$_2$O$_3$ Wt. % | SrO Wt. % | CaO Wt. % | SiO$_2$ [2] Wt. % | SiC Reinforcing Material | | Phases [4] | |
|---|---|---|---|---|---|---|---|---|---|
| | | | | | | Wt. % | Form [3] | Not Annealed | Annealed |
| d | 80.013 | 5.506 | 3.197 | 0.172 | 1.052 | 10.061 | whiskers | β, α, SiC | β, α, SiC, A |
| e | 80.013 | 5.506 | 3.197 | 0.172 | 1.052 | 10.061 | platelets | β, SiC | β, SiC, A |
| f | 71.411 | 5.167 | 2.877 | 0.154 | 0.710 | 20.245 | 10% whiskers, 10% platelets | β, SiC | β, SiC, A |

[1] Samples are hot-pressed at 1825° C. for 1 hr., then annealed at 1350° C. for 50 hours.
[2] Includes surface silica from Si$_3$N$_4$ powder.
[3] Silicon carbide source: particles (a) and (c), Ferro (BSC-21); particles (b) Ibeden UF-B; whiskers, American Matrix; and platelets, C-Axis.
[4] β-Si$_3$N$_4$; α-Si$_3$N$_4$; SiC of Examples E-4a,b,c,d has cubic structure; SiC of Examples E-4e,f has 4H structure; A is oxynitride apatite.

The powder compositions of Table IV are hot pressed and annealed as specified in Example 1. The resulting silicon nitride ceramics are analyzed by X-ray diffraction which shows that in each case a crystalline grain boundary phase is obtained having an oxynitride apatite structure. It is observed that the silicon carbide reinforcing material does not inhibit the formation of the crystalline oxynitride apatite grain boundary phase.

What is claimed is:

1. A process for preparing a silicon nitride ceramic body containing predominantly β-silicon nitride whiskers having a high average aspect ratio and further containing a crystalline grain boundary phase having an oxynitride apatite structure, the process comprising: subjecting a powder mixture comprising
    (a) silicon nitride in an amount sufficient to provide a ceramic body;
    (b) a densification aid, said densification aid being a source of strontium, optionally, in combination with a source of an element selected from the group consisting of lithium, sodium, calcium, barium or mixture thereof, said source(s) being present in an amount sufficient to promote densification of the powder;
    (c) a conversion aid, said conversion aid being a source of an element selected from the group consisting of yttrium, lanthanum, cerium, neodymium, samarium, europium, gadolinium, terbium, dysprosium, holmium, erbium, ytterbium and thorium, and mixtures thereof, said source being present in an amount sufficient to promote the conversion of the starting silicon nitride to predominantly β-silicon nitride;
    (d) at least one whisker growth enhancing compound in an amount sufficient to promote the formation of β-silicon nitride whiskers, said compound being a metal oxide or metal non-oxide derivative wherein the metal is selected from the group consisting of lithium, sodium, calcium, scandium, titanium and aluminum, and mixtures thereof; the optional densification aid in (b) and the whisker growth enhancing compound of (d) being derived from different elements; and
    (e) silica in an amount sufficient to provide the oxynitride apatite crystalline grain boundary phase; to conditions of temperature and pressure sufficient to provide for densification and in situ formation of β-silicon nitride whiskers having an average aspect ratio of at least about 2.5, and thereafter subjecting the densified composition to annealing for a time sufficient to produce a crystalline grain boundary phase having an oxynitride apatite structure, as determined by X-ray crystallography.

2. The process of claim 1 wherein the β-silicon nitride whiskers have an aspect ratio of between about 2 and about 16 and are present in an amount of at least about 20 volume percent, as measured by viewing one plane of the silicon nitride ceramic body by scanning electron microscopy.

3. The process of claim 1 wherein the starting silicon nitride contains no greater than about 10 weight percent β-silicon nitride.

4. The process of claim 1 wherein the densification aid is present in an amount within a range of from about 0.04 weight percent to about 10.0 weight percent based on the total weight of the powder mixture.

5. The process of claim 4 wherein the densification aid is strontium oxide

6. The process of claim 1 wherein the conversion aid is present in an amount within a range of from about 0.2 weight percent to about 29.5 weight percent based on the total weight of the powder mixture.

7. The process of claim 1 wherein the densification aid and the conversion aid are present in amounts sufficient to provide a weight ratio of conversion aid to densification aid of from about 0.25 to about 8.

8. The process of claim 7 wherein the weight ratio is from about 1:1 to about 1.8:1.

9. The process of claim 1 wherein the conversion aid is yttrium oxide.

10. The process of claim 1 wherein the whisker growth enhancing compound is present in an amount of from about 0.01 to about 5.0 weight percent based upon total weight of the powder mixture.

11. The process of claim 1 wherein the whisker growth enhancing compound is calcium oxide.

12. The process of claim 1 wherein the powder mixture comprises silica in a total amount, including the silica present on the surface of the silicon nitride, ranging from about 2.3 to about 6 weight percent, based upon total weight of the powder mixture.

13. The process of claim 1 wherein the annealing step comprises heating the densified composition at a temperature in the range from about 1000° C. to about 1550° C. for a time ranging from about 2 hr to about 100 hr.

14. The process of claim 1 wherein the powder mixture further comprises a Palmqvist toughness enhancing amount of at least one preformed reinforcing material selected from the group consisting of β-silicon nitride in whisker and fiber form, and silicon carbide, titanium carbide, boron carbide, titanium diboride, and zirconium oxide in a form selected from the group consisting of whisker, fiber, particle and platelet forms.

15. The process of claim 14 wherein a total of the amount of silicon nitride plus the amount of preformed reinforcing material is in a range of from about 65 to about 99.75 weight percent based on the total weight of the powder mixture 16. The process of claim 15 wherein the total amount of silicon nitride plus the amount of reinforcing material is from about 80 to about 97 weight percent based upon total weight of the powder mixture.

17. The process of claim 1 wherein the powder mixture further comprises a Palmqvist toughness enhancing amount of at least one preformed, coated reinforcing material, the material being selected from the group consisting of magnesium oxide, aluminum nitride and mullite and having a coating of a material selected from the group consisting of silicon carbide, titanium carbide, boron carbide, titanium diboride, and zirconium oxide, said coated material being in a physical form selected from the group consisting of whiskers, fibers, particles and platelets.

18. The process of claim 16 wherein a total of the amount of silicon nitride plus the amount of preformed, coated reinforcing material is in a range of from about 65 to about 99.75 weight percent based on the total weight of the powder mixture.

19. The process of claim 1 wherein the densification temperature is in the range from about 1700° C. to about 1870° C.

20. The process of claim 1 wherein the densification pressure is in the range from about 3000 psig to about 6000 psig.

21. The process of claim 1 wherein the density of the silicon nitride ceramic is at least about 97 percent of the theoretical value.

22. The process of claim 1 wherein the crystallinity of the grain boundary phase is greater than about 90 percent.

23. A silicon nitride ceramic body having a Palmqvist fracture toughness greater than about 37 Kg/mm at about 23° C., comprising:
(a) a crystalline phase of $\beta$-silicon nitride of which at least about 20 volume percent, as measured by viewing one plane of the silicon nitride ceramic body by scanning electron photomicrographs, is in the form of whiskers having an average aspect ratio of at least about 2.5; and (b) a crystalline grain boundary phase having an oxynitride apatite structure, as determined by X-ray crystallography, in an amount not greater than about 35 weight percent of the total weight, represented by the general formula $A_xB_{10-x}[Si(O,N)_4]_6(O,N)_y$ wherein A is strontium, optionally, in combination with an element selected from the group consisting of calcium, barium, lithium, sodium, scandium, titanium, aluminum, and mixtures thereof; B is an element selected from the group consisting of yttrium, lanthanum, cerium, neodymium, samarium, europium, gadolinium, terbium, dysprosium, holmium, erbium, ytterbium and thorium and mixtures thereof; x is a positive number greater than 0 and equal to or less than about 4; and y is a positive number ranging from 0 to about 2.

24. The body of claim 23 further comprising a Palmqvist toughness enhancing amount of at least one preformed reinforcing material selected from the group consisting of $\beta$-silicon nitride in whisker and fiber form, and silicon carbide, titanium carbide, boron carbide, titanium diboride, and zirconium oxide in a form selected from the group consisting of whisker, fiber, particle and platelet forms.

25. The body of claim 23 further comprising a Palmqvist toughness enhancing amount of at least one preformed, coated reinforcing material, the material being selected from the group consisting of magnesium oxide, aluminum nitride and mullite and having a coating of a material selected from the group consisting of silicon carbide, titanium carbide, boron carbide, titanium diboride, and zirconium oxide, said coated material being in a physical form selected from the group consisting of whiskers, fibers, particles and platelets.

26. The body of claim 23 wherein the crystallinity of the grain boundary phase is greater than about 90 volume percent.

27. The body of claim 23 wherein the Vickers hardness as measured at room temperature is in the range from about 1400 kg/mm$^2$ to about 1700 kg/mm$^2$.

28. The body of claim 23 wherein the Palmqvist toughness, as measured at room temperature, is in the range from about 37 kg/mm to about 50 kg/mm.

29. The body of claim 23 wherein the fracture strength, as measured at 1375° C. is at least about 350 MPa.

30. A cutting tool fabricated from the body of claim 23.

* * * * *